United States Patent
Yoneyama et al.

(10) Patent No.: US 6,757,550 B1
(45) Date of Patent: Jun. 29, 2004

(54) MOBILE STATION AND BASE STATION

(75) Inventors: Masayuki Yoneyama, Suita (JP); Shigeki Harada, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 384 days.

(21) Appl. No.: 09/658,270

(22) Filed: Sep. 8, 2000

(30) Foreign Application Priority Data

Sep. 8, 1999 (JP) .......................................... 11-254654

(51) Int. Cl.[7] .............................................. H04Q 7/20
(52) U.S. Cl. ...................... 455/525; 455/436; 455/437
(58) Field of Search ................................. 455/436, 437, 455/438, 439, 440, 441, 442, 445, 444, 525, 524; 370/331, 332, 333; 375/346

(56) References Cited

U.S. PATENT DOCUMENTS

| 5,067,171 A | * | 11/1991 | Kawano | 455/436 |
| 5,287,544 A | * | 2/1994 | Menich et al. | 455/450 |
| 5,406,588 A | * | 4/1995 | Birchler et al. | 375/346 |
| 5,471,670 A | * | 11/1995 | Hess et al. | 455/437 |
| 5,487,174 A | * | 1/1996 | Persson | 455/444 |
| 5,499,386 A | * | 3/1996 | Karlsson | 455/444 |
| 5,649,290 A | * | 7/1997 | Wang | 370/332 |
| 5,752,190 A | * | 5/1998 | Kaewell et al. | 455/436 |
| 6,295,279 B1 | * | 9/2001 | Lin | 370/252 |
| 6,411,662 B1 | * | 6/2002 | Sakoda et al. | 375/340 |

FOREIGN PATENT DOCUMENTS

| JP | 10-94047 | 4/1998 |
| JP | 11-205843 | 7/1999 |
| WO | WO 92/11736 | 7/1992 |

* cited by examiner

Primary Examiner—Charles Appiah
(74) Attorney, Agent, or Firm—Arent Fox PLLC

(57) ABSTRACT

A mobile station that selects one of a plurality of base stations according to electric field strengths of signals transmitted on control channels corresponding to the plurality of base stations, and establishes first a link and then a call connection with the selected base station on a traffic channel that is assigned via a control channel corresponding to the selected base station, the mobile station including: a measuring unit for measuring an electric field strength of a signal on the traffic channel when a link operation is performed to establish the link for the traffic channel; and a judging unit for judging whether the link operation should be continued according to the measured electric field strength.

11 Claims, 7 Drawing Sheets

MOBILE STATION AND BASE STATION

BACKGROUND OF THE INVENTION

1. Field of the Invention

The present invention relates to a mobile station that selects one of a plurality of base stations according to the electric field strengths of control channels of the plurality of base stations and establishes a link and a call connection with the selected base station on the traffic channel assigned by the base station. The present invention also relates to a base station for the mobile station.

2. Background Art

In recent years, mobile stations for use in mobile communication systems, such as PHS (Personal Handy phone System) and PDC (Personal Digital Cellular telecommunication system), have been brought into common use because of their reduced size and weight and the improved communication quality.

In the PHS and PDC, communication takes place between mobile stations and base stations using traffic channels (hereinafter abbreviated to "TCHs") and control channels (hereinafter abbreviated to "CCHs"). Here, a TCH means a channel used for the communication between a mobile station and a base station and a CCH means a channel used to control the switching to a TCH when a mobile station places or receives a call in a standby status.

FIG. 7 shows base station selection processing performed by a conventional mobile station (referred to as "PS" in the drawing) based on a PHS method, and a link channel establishment sequence performed when a CCH between the mobile station and a conventional base station (referred to as "CS" in the drawing) is switched to a TCH.

The base station selection processing is performed, for instance, when the mobile station is (1) switched on, (2) searching for a new base station during handover, and (3) designated by a current base station to switch to a new base station during communication.

During the base station selection processing, the mobile station first monitors CCHs of a plurality of base stations. In the case of the PHS, a specific frequency is allocated to CCHs and the plurality of base stations transmit signals on their CCHs by time division multiplexing. The mobile station sequentially receives a signal transmitted on each CCH, decodes the signal, and, if the identifier of a base station (CSID) is detected from the decoded signal, stores the CSID along with the electric field strength of the signal (S51). In this manner, the mobile station obtains a plurality of pairs of CSIDs and electric field strengths. The mobile station sorts the pairs in decreasing order of electric field strength (S52), and selects a base station having a CSID that is paired with the highest electric field strength (S53). The mobile station then enters into a standby status on the CCH of the selected base station. If the base station selection processing is performed immediately after the mobile station is switched on, the mobile station performs location registration for the selected base station before entering into the standby status.

The link channel establishment sequence is performed, for instance, when the mobile station (1) places a call in a standby status, (2) receives a call in a standby status, and (3) switches to a new base station during handover.

In the link channel establishment sequence, the mobile station issues a link channel establishment request to the base station, which has been selected in the base station selection processing, on the CCH of the base station (S151), receives a link channel assignment message from the base station (the base station issues the link channel assignment message in response to the link channel establishment request) (S152), and measures the electric field strength of the U wave (undesired wave) of the assigned TCH (the TCH specified by the link channel assignment message) (S153). Because this measurement is performed immediately after a link channel is assigned, which is to say before any signal is exchanged between the base station and the mobile station on the TCH, the measured electric field strength represents the level (electric field strength) of the U wave (an interference wave) of the assigned TCH. If the level of the U wave is high, the processing returns to S151 and the stated operations in S151–S153 are performed again.

If the level of the U wave is low, the mobile station then transmits synch burst signals to the base station (S154), the base station returns the synch burst signals to the mobile station (S155), the mobile station transmits TCH idle burst signals to the base station (S156), and the base station returns the TCH idle burst signals to the mobile station (S157). In this manner, synchronization is established on the TCH. The stated processing until the synchronization establishment is the link channel establishment sequence and corresponds to Layer 1 (the physical layer).

After the link channel establishment sequence, the mobile station checks whether the base station is ready for communication and then the base station checks whether the mobile station is ready for communication (S159 and S160). This processing corresponds to Layer 2 (the data link layer).

Following Layers 1 and 2, call connection messages or location registration messages are exchanged between the mobile station and the base station. This processing corresponds to Layer 3 (the network layer) and above.

The base station selection processing and the link channel establishment sequence for switching from a CCH to a TCH have been described above by taking the case of the PHS as an example. However, similar processing is performed in other systems, such as PDC, where channels are classified into CCHs and TCHs.

In some cases, the mobile station is assigned by the base station a TCH whose electric field strength is extremely lower than that of the monitored CCH and is insufficient for actual communication, such as conversation. In such cases, there are various problems, such as a high frame error rate, inappropriate message exchanges in Layers 2 and 3, and a wireless connection failure.

This is due to the transmission power control by the base station and the change in reception condition of the mobile station. The transmission power control means the adjustment of transmission power by the base station according to the electric field strength of a transmission signal from the mobile station. In many cases, a base station in the PHS uses a power of 500 mW for transmission on a CCH and uses a power ranging from 20 mW to 500 mW for transmission on a TCH by performing the transmission power control. As a result, in some cases, the electric field strength of a TCH assigned to a mobile station significantly differs from that of a CCH. Also, the reception condition of a mobile station changes considerably due to the change in direction and location of the mobile station and the influence of nearby buildings (the location of the mobile station in particular changes while the user is moving at high speed). As a result, in some cases, a mobile station is assigned a TCH whose electric field strength is insufficient for actual communication.

SUMMARY OF THE INVENTION

The object of the present invention is therefore to provide a mobile station that is surely assigned a traffic channel having an electric field strength at which transmission errors will rarely occur, and a base station for the mobile station.

The stated object is achieved by a mobile station that selects one of a plurality of base stations according to electric field strengths of signals transmitted on control channels corresponding to the plurality of base stations, and establishes first a link and then a call connection with the selected base station on a traffic channel that is assigned via a control channel corresponding to the selected base station, the mobile station including: a measuring unit for measuring an electric field strength of a signal on the traffic channel when a link operation is performed to establish the link for the traffic channel; and a judging unit for judging whether the link operation should be continued according to the measured electric field strength.

With this construction, it is judged whether the link operation should be continued according to the measured electric field strength. That is, only if the measured electric field strength is sufficient for actual communication, the link and call connection is established. This guarantees that the mobile station is assigned a traffic channel having an electric field strength at which transmission errors will rarely occur.

Here, when the measured electric field strength is not more than a predetermined value, the judging unit may judge that the link operation should be terminated. If the judging unit has judged that the link operation should be terminated, the mobile station may newly select one of the plurality of base stations and request the newly selected base station to assign a traffic channel.

With this construction, if the measured electric field strength is not more than the predetermined value, the mobile station requests the newly selected base station to assign a traffic channel. This guarantees that the mobile station is assigned a traffic channel having an electric field strength at which transmission errors will rarely occur.

Here, the measured electric field strength may include a signal level and a noise level, the signal level being a reception signal level when a signal is received from the selected base station on the traffic channel, and the noise level being a reception signal level when no signal is received from the selected base station on the traffic channel, and the judging unit may judge that the link operation should be terminated if the signal level is not more than a first threshold value or a difference between the signal level and the noise level is not more than a second threshold value.

With this construction, the judging unit judges whether the link operation should be continued according to the signal level and noise level of the traffic channel. As a result, with more reliability, the mobile station is assigned a traffic channel on which transmission errors will rarely occur.

Here, the mobile station may newly select one of the plurality of base stations and request the newly selected base station to assign a traffic channel if the judging unit has judged that the link operation should be terminated. When newly selecting one of the plurality of base stations, the mobile station may select the previously selected base station again.

With this construction, if the judging unit has judged that the link operation should be terminated, the mobile station newly selects a base station and requests the newly selected base station to assign a traffic channel. As a result, the mobile station is surely assigned a traffic channel on which transmission errors will rarely occur.

The stated object is also achieved by a base station that assigns a traffic channel to a mobile station and establishes first a link and then a call connection with the mobile station on the traffic channel, including: a measuring unit for measuring an electric field strength of a signal on the traffic channel when a link operation is performed to establish the link for the traffic channel; and a judging unit for judging whether the link operation should be continued according to the measured electric field strength.

With this construction, it is judged whether the link operation should be continued according to the measured electric field strength. That is, only if the measured electric field strength is sufficient for actual communication, the link and call connection is established. This guarantees that the mobile station is assigned a traffic channel having an electric field strength at which transmission errors will rarely occur.

Here, the measured electric field strength may include a signal level and a noise level, and the judging unit may judge whether the link operation should be continued according to the signal level and noise level.

With this construction, the judging unit judges whether the link operation should be continued according to the signal level and noise level of the traffic channel. As a result, with more reliability, the mobile station is assigned a traffic channel on which transmission errors will rarely occur.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

A mobile station of an embodiment of the present invention is described below with reference to the drawings.

<Construction of Mobile station>

Figure 1:
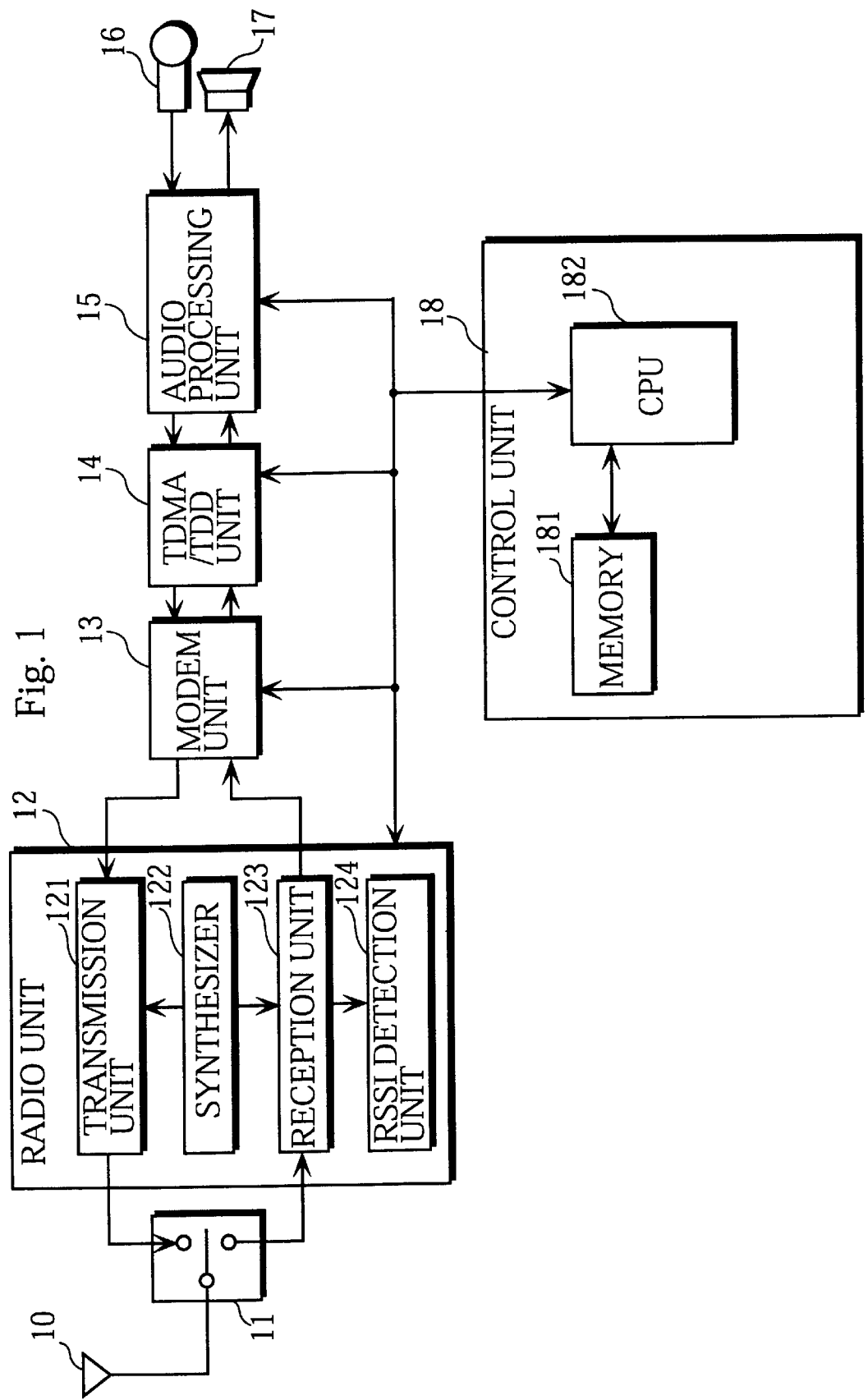
FIG. 1 is a block diagram showing the construction of a mobile station of an embodiment of the present invention.

FIG. 1 is a block diagram showing the construction of the mobile station of the present embodiment. As shown in this drawing, the mobile station includes an antenna 10, a transmission/reception switch unit 11, a radio unit 12, a modem unit 13, a TDMA/TDD (Time Division Multiple Access/Time Division Duplex) unit 14, an audio processing unit 15, a microphone 16, a speaker 17, and a control unit 18. With this construction, if the RSSI (received signal strength indicator) of the TCH assigned by a base station is found insufficient during the switching from a CCH to the TCH, this mobile station requests the base station to assign another TCH or requests another base station to assign a TCH. It should be noted here that an RSSI is also referred to as an electric field strength in this specification.

The circuit segment including the antenna 10, the transmission/reception switch unit 11, the radio unit 12, the modem unit 13, the TDMA/TDD unit 14, the audio processing unit 15, the microphone 16, and the speaker 17 in this drawing is common among mobile stations based on a TDMA/TDD method and performs, for instance, wireless communication of a TDMA/TDD method stipulated by the PHS standard "RCR STD-28". Therefore, this segment is not described here and the TDMA/TDD method is briefly described below.

Figure 2:
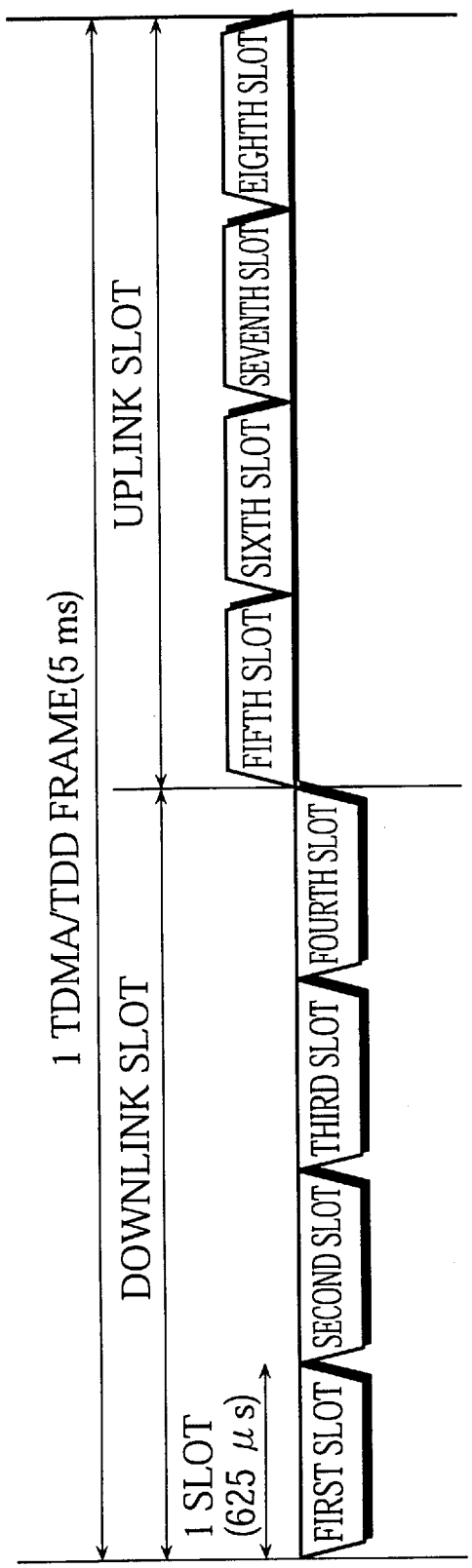
FIG. 2 shows the construction of a TDMA/TDD frame.

FIG. 2 shows a TDMA/TDD frame for a time division multiplex method in the PHS. In this embodiment, each frame of the TDMA/TDD method is five milliseconds in length and is divided into eight time slots. The first to fourth slots are assigned to downlink communication (communication from a base station to a mobile station), while the fifth to eighth slots are assigned to uplink communication (communication from a portable telephone to a mobile station). Slots used for downlink communication are hereinafter referred to as "downlink slots" and slots used for uplink communication as "uplink slots".

Each TCH is a pair of a uplink slot and a downlink slot and, for instance, a TCH is made up of the first slot and the fifth slot and another TCH is made up of the second slot and the sixth slot. Also, TCHs are allocated a plurality of carrier wave frequencies (around 10–20 waves). Therefore, each TCH is specified using a carrier wave frequency (carrier number), an uplink slot number, and a downlink slot number.

Each CCH is also a pair of a uplink slot and a downlink slot. CCHs are allocated one or two carrier wave frequencies (waves) and signals are intermittently transmitted using the carrier waves of the CCHS. For instance, each base station exchanges signals with a mobile station once every 100 ms (20 frames). In this case, a mobile station can exchange signals with up to 80 base stations (20 frames×4 (the number of channels within a frame)) using the carrier waves of CCHs by time division multiplexing.

The control unit 18 includes a memory 181 and a CPU 182, and controls the overall operation of the mobile station by executing programs stored in the memory 181 using the CPU 182. Under the control by the control unit 18, the mobile station performs the link channel establishment sequence for switching from a CCH to a TCH shown in FIG. 3. In particular, under the control by the control unit 18, the mobile station issues a TCH assignment request to a current base station on the CCH of the base station (S10), receives a TCH assignment message from the base station (the base station issues the TCH assignment message in response to the TCH assignment request) (S11), detects the RSSI of a signal, which is transmitted from the base station on the assigned TCH to establish a link (S16), using a RSSI detection unit 124, and judges whether the RSSI is at least equal to a threshold value "Th1" (S17). If the RSSI is less than the threshold value Th1, the mobile station terminates the link establishment processing and reissues the TCH assignment request on a CCH.

In S17, the mobile station also judges whether the difference between the RSSI of the TCH and that of the U wave (interference wave) is at least equal to a threshold value "Th2". If the difference is less than the threshold value Th2, the mobile station reissues the TCH assignment request. It should be noted here that the RSSI of a U wave represents a noise level.

If the RSSI of the TCH is at least equal to the threshold value Th1 and the difference between the RSSI of the TCH and that of the U wave is also at least equal to the threshold value Th2, the mobile station continues the exchange of burst signals (signals for establishing synchronization) with the base station. In this manner, a link between the mobile station and the base station is established on the TCH.

As described above, if the electric field strength (RSSI) of the TCH assigned by the base station is insufficient for actual communication (such as conversation), the mobile station reissues the TCH assignment request to obtain the assignment of another TCH. As a result, before starting actual communication, the mobile station is assigned a TCH having an electric field strength at which transmission errors will rarely occur.

<Link Channel Establishment Processing of Mobile station>

Figure 3:
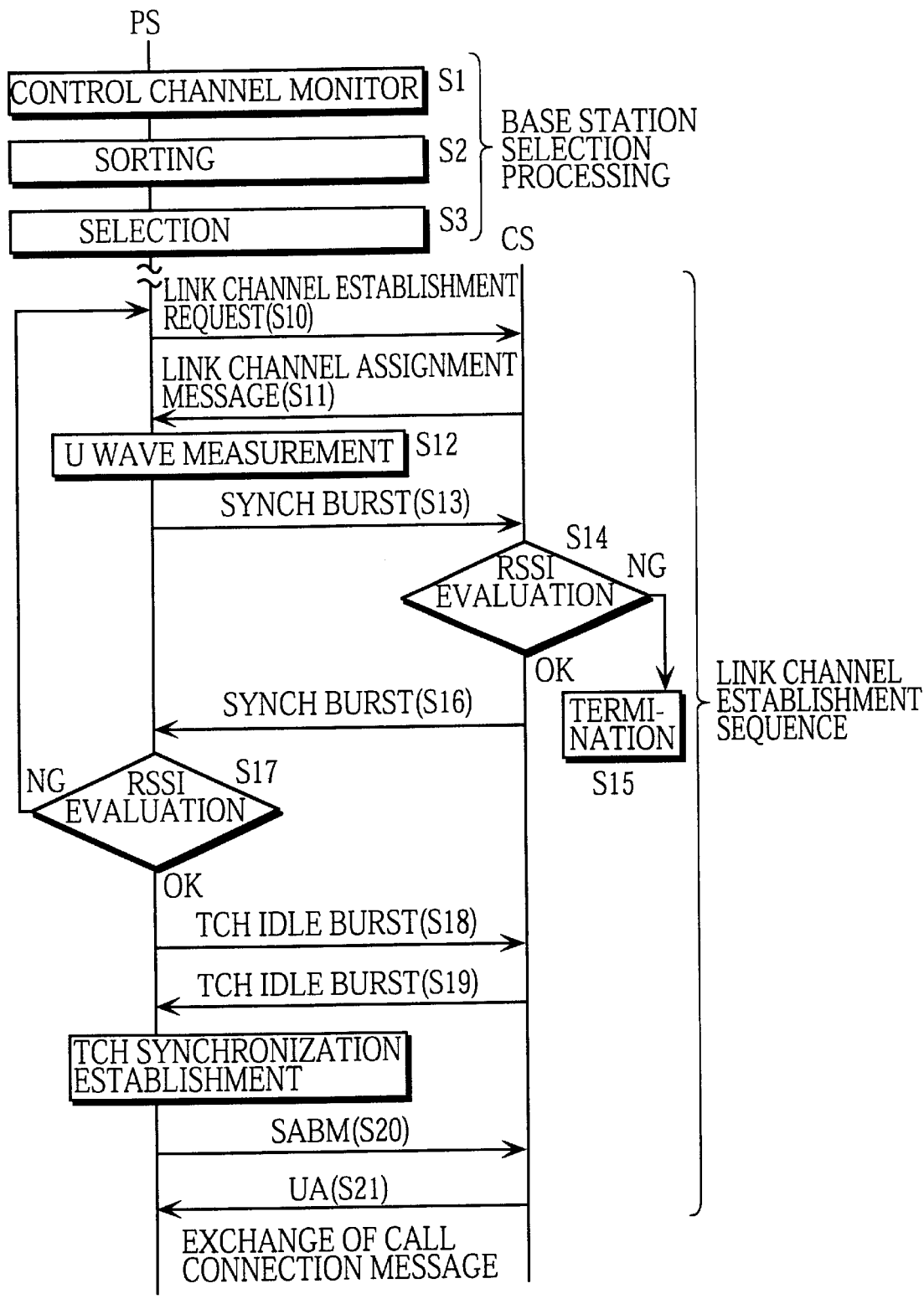
FIG. 3 shows a base station selection processing and link channel establishment sequence of the embodiment.
Figure 4:
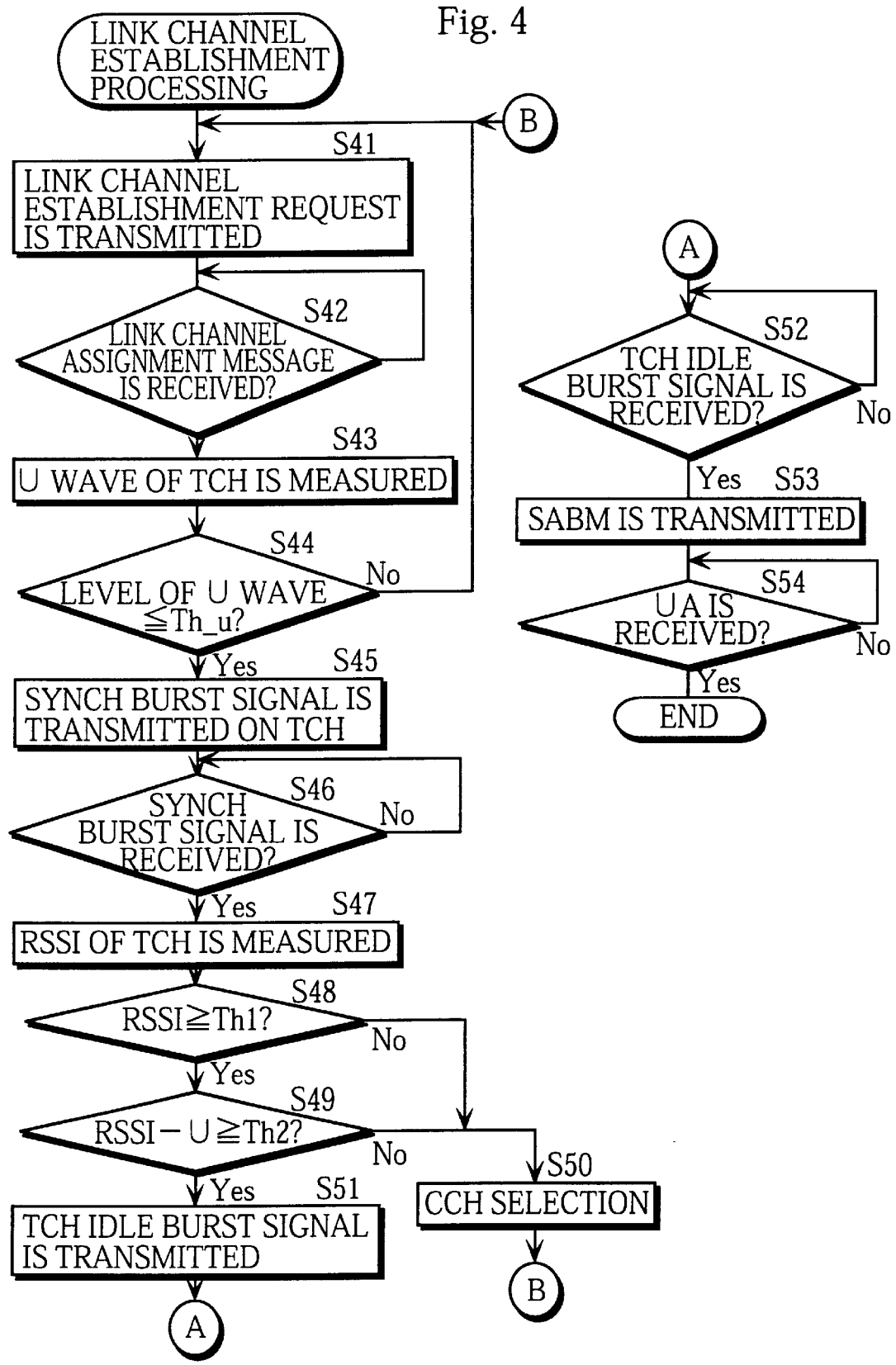
FIG. 4 is a flowchart showing the detailed link channel establishment processing of the mobile station.

FIG. 4 is a flowchart showing the detailed link channel establishment processing performed by the present mobile station under the control by the control unit 18. The link channel establishment processing is performed to switch from a CCH to a TCH and includes the assignment of a TCH by a base station and the establishment of synchronization prior to the actual communication on the assigned TCH. The link channel establishment processing corresponds to the processing of the mobile station in the link channel establishment sequence shown in FIG. 3. This processing is performed, for instance, when the mobile station (1) places a call in a standby status on a CCH, (2) receives a call from a base station in a standby status on a CCH, (3) switches to a new base station during handover, and (4) newly performs location registration.

In these cases, the mobile station operates as follows under the control by the control unit 18. The mobile station first issues a link channel establishment request to a current base station on the CCH of the base station (S41), and receives a link channel assignment message from the base station (the base station issues the link channel assignment message in response to the link channel establishment request). The link channel assignment message includes the carrier number of a carrier wave frequency and slot numbers with which the mobile station finds which TCH is assigned. The mobile station then tunes to the assigned TCH using the radio unit 12 and detects the RSSI of the TCH while no signal is being transmitted from the base station, which is to say the RSSI of the U wave (interference wave) of the TCH, using the RSSI detection unit 124 (S43).

If the RSSI of the U wave exceeds a threshold value "Th_u" (S44), the operation of the mobile station returns to step S41 to reissue the link channel establishment request. This is because if the RSSI of the U wave exceeds Th_u, it means that the assigned TCH is used by a nearby base station and so another TCH needs to be assigned to the mobile station.

If the RSSI of the U wave is not more than the threshold value Th_u, the mobile station transmits synch burst signals to the base station on the assigned TCH (S45). Here, a synch burst signal includes a 32-bit code called UW32 (Unique Word 32) and is transmitted in each TDMA/TDD frame to establish synchronization at a TDMA/TDD frame level and a time slot level. On receiving the synch burst signals, the base station establishes synchronization and sequentially returns the synch burst signals to the mobile station on the TCH.

On receiving the synch burst signals from the base station on the TCH (S46), the mobile station detects the RSSI of the TCH using the RSSI detection unit 124 (S47). Here, the RSSI detection unit 124 calculates the average of electric field strengths of the TCH measured in a plurality of slots (ten slots, for instance) and sets the average as the RSSI of the TCH.

The mobile station then judges whether the RSSI of the TCH satisfies the following conditions (1) and (2) (S48 and S49).

$$(\text{RSSI of } TCH) \geq Th1 \tag{1}$$

$$(\text{RSSI of } TCH) - (\text{RSSI of } U \text{ wave}) \geq Th2 \tag{2}$$

The threshold values Th1 and Th2 in the above conditions are determined empirically and experimentally. For instance, a reception characteristic curve where coordinates are set as a BER (a bit error rate) and a RSSI is obtained in advance and these threshold values are determined so that the BER falls within a range where high communication quality is guaranteed.

If the above conditions are not both satisfied, the mobile station selects the CCH of another base station (S50) and returns to the operation in S41. When doing so, the mobile station selects the CCH of the next top base station among base stations that have been sorted in decreasing order of RSSI during the base station selection processing, or performs the base station selection processing again and newly selects the CCH of a base station. To shorten the processing time, it is more preferable to select the CCH of the next top base station than to perform the base station selection processing again.

If both of the above conditions are satisfied, the mobile station transmits TCH idle burst signals to the base station on the TCH (S51). Here, each TCH idle burst signal includes a 16-bit code called UW16 (Unique Word 16) and is sequentially transmitted to establish synchronization at a symbol level. On receiving the TCH idle burst signals, the base station establishes synchronization and sequentially returns the TCH idle burst signals to the mobile station on the TCH. On receiving the TCH idle burst signals from the base station (S52), the mobile station transmits an SABM (Set Asynchronous Balanced Mode) to the base station on the TCH and receives a UA (Unnumbered Acknowledgment) from the base station on the TCH (S53 and S54). In this manner, the data link in Layer 2 (data link layer) is established. Following the processing described above, a call connection is established on the TCH and the mobile station enters into a conversation status or performs location registration on the TCH.

It should be noted here that in FIG. 4, the mobile station does not endlessly wait to receive the link channel assignment message in S42, to receive the synch burst signals in S46, to receive the TCH idle burst signals in S52, and to receive the UA in S54. That is, if not receiving these signals from the base station even after a predetermined time (around 100 ms) has elapsed, the mobile station returns to the operation in S41 to perform the link channel establishment processing again. The mobile station performs the link channel establishment processing up to around five times as necessary.

As described above, if the electric field strength (RSSI) of the TCH assigned by the base station is insufficient for actual communication, the mobile station of the present embodiment reissues the link channel assignment request to obtain the assignment of another TCH. In this manner, the mobile station is assigned a TCH having an enough electric field strength before switching to a TCH and so high communication quality is guaranteed.

<Construction of Base Station>

Figure 5:
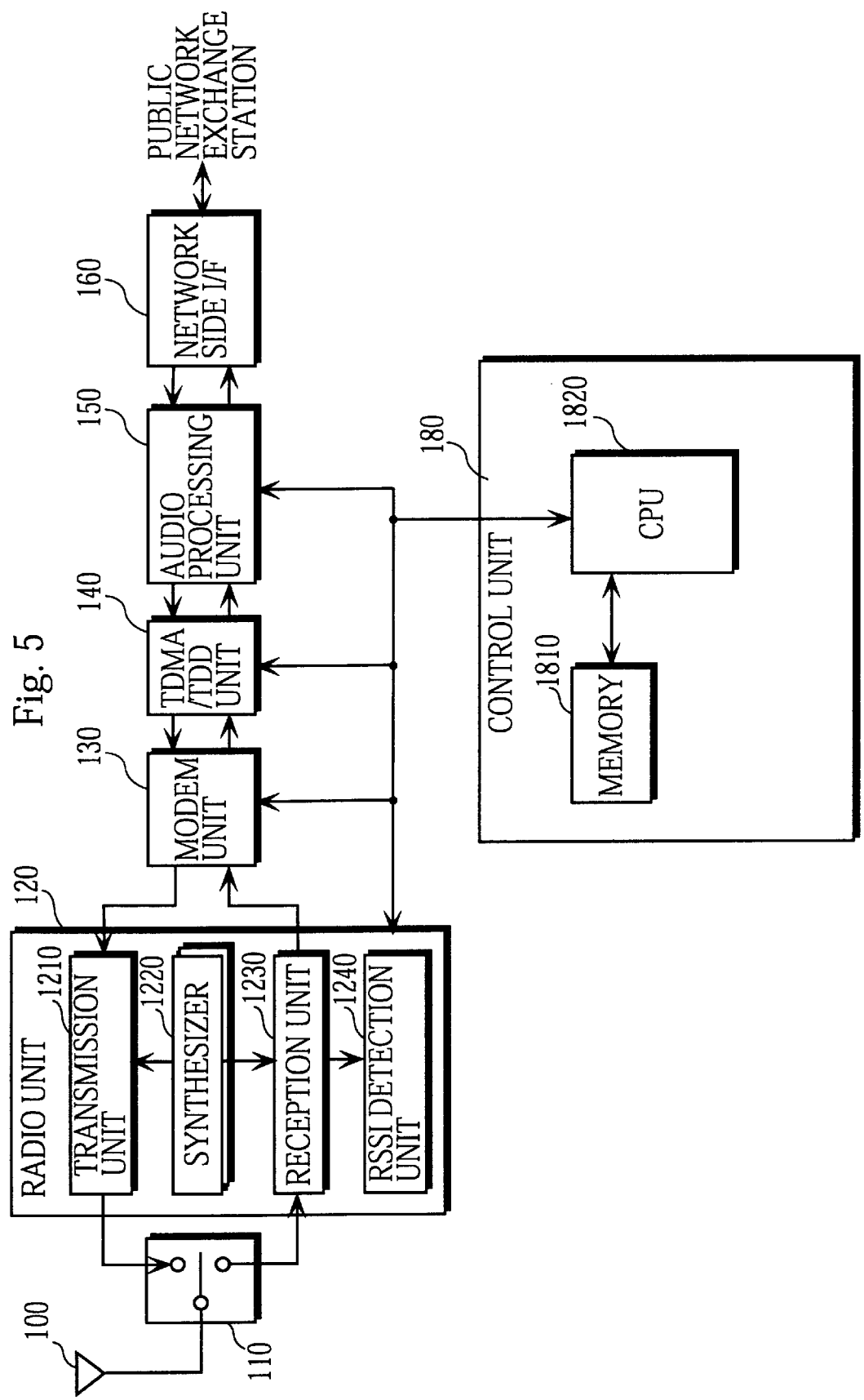
FIG. 5 is a block diagram showing the construction of a base station of the embodiment of the present invention.

FIG. 5 is a block diagram showing the construction of a base station of the embodiment of the present invention. As shown in this drawing, the present base station includes an antenna 100, a transmission/reception switch unit 110, a radio unit 120, a modem unit 130, a TDMA/TDD (Time Division Multiple Access/Time Division Duplex) unit 140, an audio processing unit 150, a network side I/F 160, and a control unit 180. With this construction, if the RSSI of a TCH, which is assigned in response to a request from a mobile station, is found insufficient for actual communication during the link channel establishment sequence, the base station terminates the link channel establishment sequence. Because the link channel establishment sequence is terminated, the mobile station reissues the link channel establishment request.

The circuit segment including the antenna 100, the transmission/reception switch unit 110, the radio unit 120, the modem unit 130, the TDMA/TDD unit 140, the audio processing unit 150, and the network side I/F 160 in this drawing is common among base stations based on the TDMA/TDD method and performs, for instance, wireless communication of a TDMA/TDD method stipulated by the PHS standard "RCR STD-28". Therefore, this segment is not described here.

The control unit 180 includes a memory 1810 and a CPU 1820, and controls the overall operation of the base station by executing programs stored in the memory 1810 using the CPU 1820. Under the control by the control unit 180, the base station performs the link channel establishment sequence for switching from a CCH to a TCH shown in FIG. 3. In particular, under the control by the control unit 180, the base station detects the RSSI of the synch burst signals, which are transmitted from the mobile station on the assigned TCH (S12), using an RSSI detection unit 1240, judges whether the RSSI is at least equal to a threshold value "Th3" (S14). If the RSSI is less than the threshold value Th3, the base station terminates the link channel establishment processing. Because the link channel establishment processing is terminated, the mobile station reissues the TCH assignment request.

If the RSSI is at least equal to the threshold value Th3, the base station then judges whether the difference between the RSSI of the TCH and that of the U wave (interference wave) of the TCH is at least equal to a threshold value "Th4". If the difference is less than the threshold value Th4, the base station terminates the link channel establishment processing.

If the RSSI of the TCH is at least equal to the threshold value Th3 and the difference between the RSSI of the TCH and that of the U wave is also at least equal to the threshold value Th4, the base station continues the exchange of burst signals (signals for establishing synchronization) with the mobile station. In this manner, a link between the mobile station and the base station is established on the TCH.

<Link Channel Establishment Processing by Mobile station>

Figure 6:
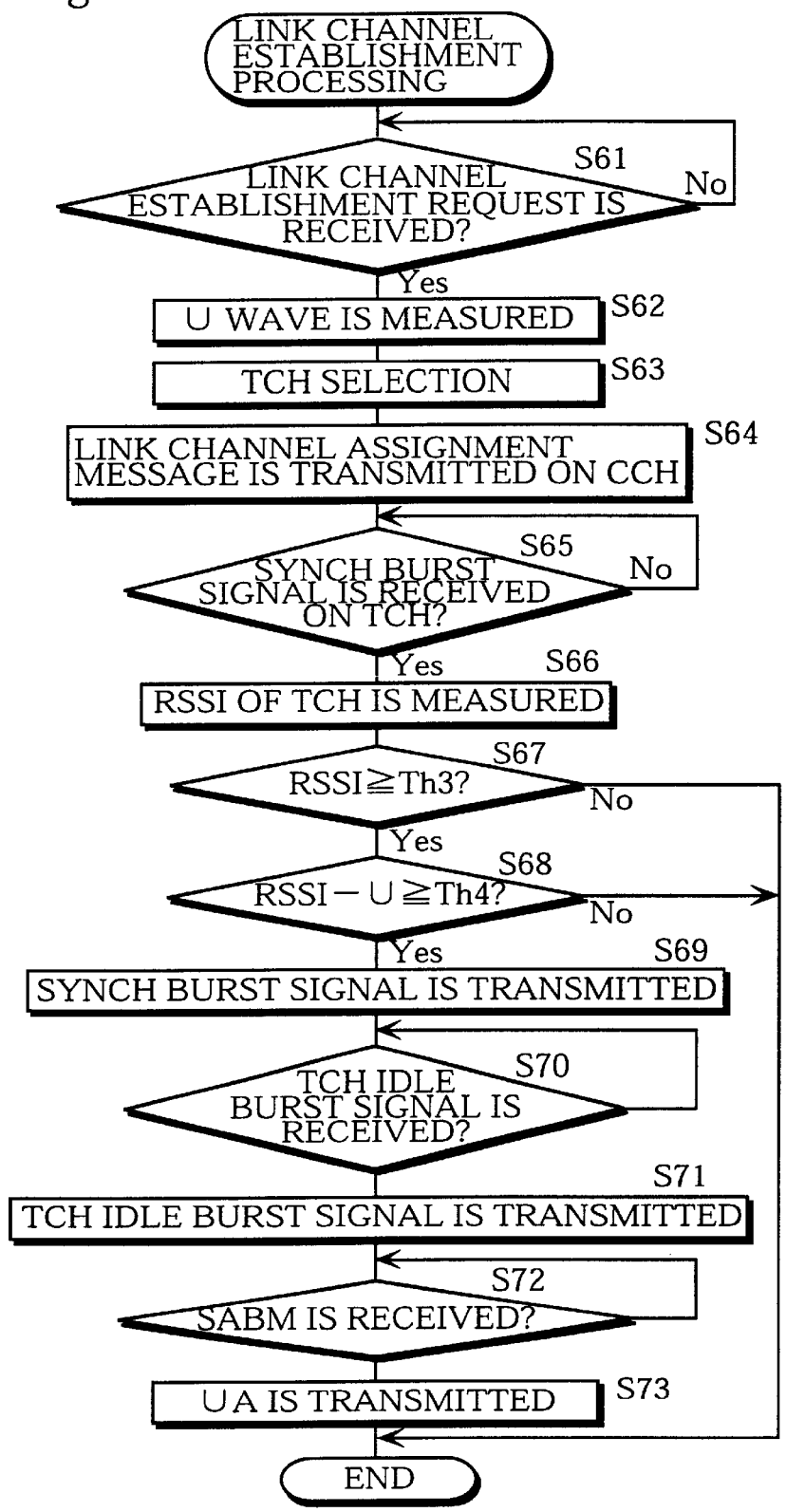
FIG. 6 is a flowchart showing the detailed link channel establishment processing of the base station.
Figure 7:
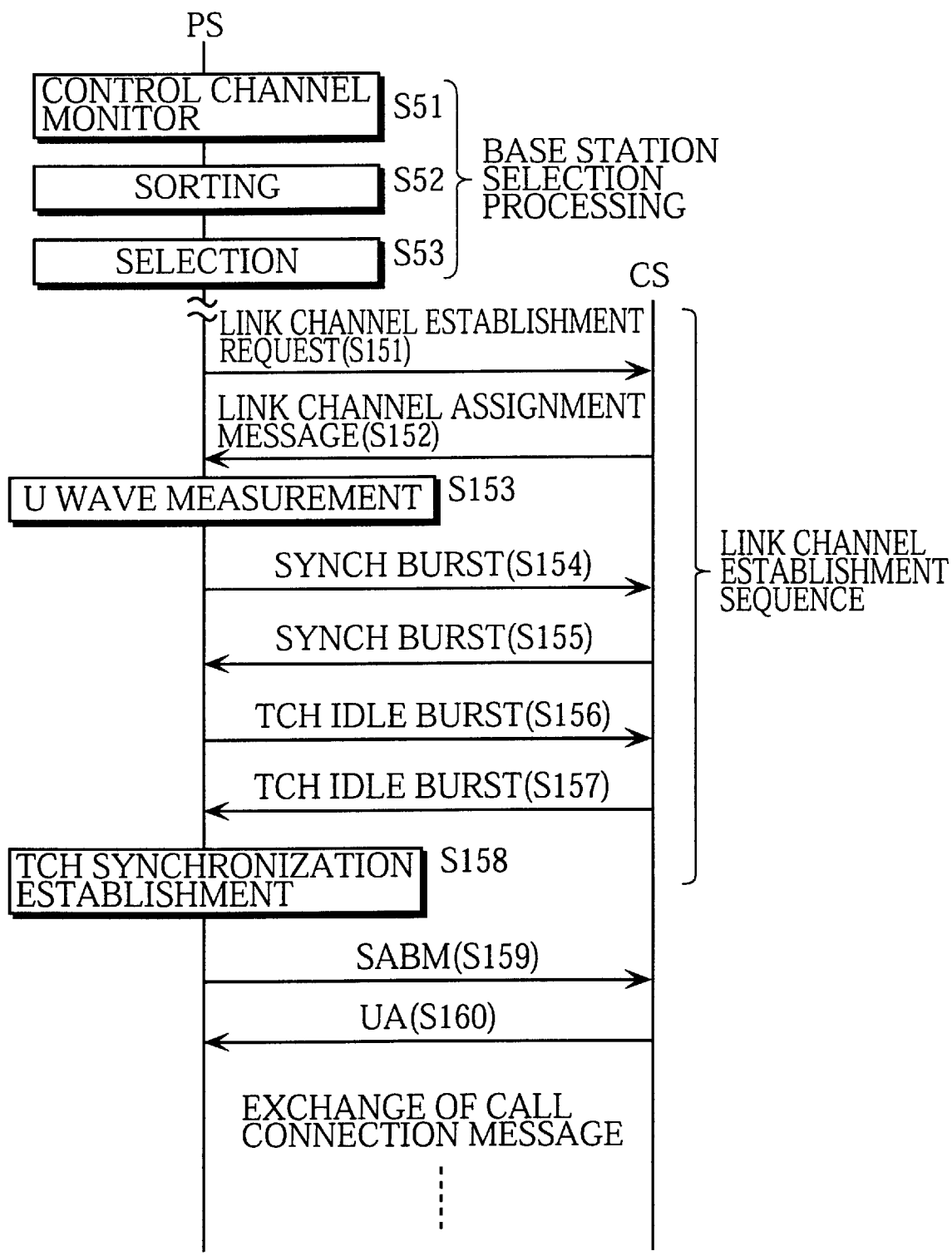
FIG. 7 shows a conventional base station selection processing and link channel establishment sequence.

FIG. 6 is a flowchart showing the detailed link channel establishment processing performed by the base station under the control unit 180. The link channel establishment processing shown in this drawing corresponds to the processing of the base station in the link channel establishment sequence shown in FIG. 3.

The base station operates as follows under the control by the control unit 180. The base station first receives a link channel establishment request from a mobile station on a CCH of the base station (S61), measures the U wave level of each carrier wave frequency of TCHs (S62), generates a list of vacant (unused) channels according to the measurement result, selects a vacant TCH whose U wave level is the lowest in the list (S63), and transmits a link channel assignment message to the mobile station on the CCH (S64).

On receiving synch burst signals from the mobile station on the assigned TCH (S65), the base station measures the RSSI of the TCH using a RSSI detection unit 1240 (S66) Here, the RSSI detection unit 1240 calculates the average of electric field strengths measured in a plurality of slots (ten slots, for instance) and sets the average as the RSSI of the TCH.

The base station then judges whether the RSSI of the TCH satisfies the following conditions (3) and (4) (S67 and S68).

$$(\text{RSSI of } TCH) \geq Th3 \tag{3}$$

$$(\text{RSSI of } TCH) - (\text{RSSI of } U \text{ wave}) \geq Th4 \tag{4}$$

The threshold values Th3 and Th4 in the above conditions are determined empirically and experimentally. For instance, a reception characteristic curve where coordinates are set as a BER and RSSI is obtained in advance and these threshold values are determined so that the BER falls within a range where high communication quality is guaranteed.

If the above conditions are not both satisfied, the base station terminates the link channel establishment processing and deletes the currently assigned TCH from the vacant channel list. It should be noted here that even if terminating the link channel establishment processing, the base station continues to intermittently transmit signals to the mobile station on the CCH. Because the synch burst signals are not returned from the base station on the TCH in this case, the mobile station judges that synchronization establishment has ended in failure and reissues the link channel establishment request on a CCH.

If both of the conditions (3) and (4) are satisfied, the base station returns the synch burst signals on the TCH (S69) and continues the link channel establishment processing (performs the operations in S70–S73).

As described above, if the electric field strength (RSSI) of the TCH assigned to a mobile station is insufficient for actual communication, the base station of the present embodiment terminates the link channel establishment processing. Because the link channel establishment processing is terminated, the mobile station reissues the link channel assignment request. In this manner, the base station guarantees that the mobile station is assigned a TCH having an enough electric field strength for actual communication and that communication of high quality is performed.

<Modifications>

The mobile station and base station of the present invention have been described above by means of an embodiment, although it should be obvious that the present invention is not limited to the embodiment. Further variations are described below.

(1) As shown in FIGS. 3 and 4, in the above embodiment, the mobile station evaluates the RSSI of the synch burst signals transmitted from the base station. However, the mobile station may instead evaluate the RSSI of the TCH idle burst signals transmitted from the base station. In this case, the mobile station is modified so that the RSSI evaluation processing (S47–S50) is performed between S52 and S53 in the flowchart shown in FIG. 4. Also, in addition to the evaluation of the RSSI of the synch burst signals, the mobile station may also evaluate the RSSI of the TCH idle burst signals. In this case, the mobile station is modified so that the RSSI evaluation processing (S47–S50) is performed again between S52 and S53 in the flowchart shown in FIG. 4.

(2) Like the modification (1), the base station may evaluate the RSSI of the TCH idle burst signals in stead of the RSSI of the synch burst signals. In this case, the base station is modified so that the RSSI evaluation processing (S66–S68) is performed between S70 and S71 in the flowchart shown in FIG. 6. Also, in addition to the evaluation of the RSSI of the synch burst signals, the mobile station may also evaluate the RSSI of the TCH idle burst signals. In this case, the base station is modified so that the RSSI evaluation processing (S66–S68) is performed again between S70 and S71 in the flowchart shown in FIG. 6.

(3) In FIG. 4, the mobile station compares the RSSI of the TCH with the threshold value Th1 and compares the difference between the RSSI of the TCH and that of the U wave with the threshold value Th2 in S47–S50. However, even if the mobile station is modified to perform only one of these comparisons, the present invention achieves a sufficient effect. In this case, one of steps S48 and S49 in the flowchart shown in FIG. 4 is omitted.

(4) Like the modification (3), the base station may be modified so that one of steps S67 and S68 in the flowchart shown in FIG. 6 is omitted.

(5) In step S49 shown in FIG. 4 and step S68 shown in FIG. 6, the difference between the RSSI of the TCH and that of the U wave is compared with a threshold value. However, in these steps, the ratio between the RSSI of the TCH and that of the U wave may be compared with a threshold value.

(6) In the above embodiment, the mobile station and the base station of the present invention are applied to the so-called second-generation cordless telephone system (PHS). However, the present invention is applicable to any other system, such as PDC, where communication channels are classified into CCHs and TCHs (for instance, either the frequencies f or time slots of the CCHs differ from those of the TCHs).

(7) In FIG. 4, it is judged whether the RSSI of an assigned TCH is at least equal to Th1 in S48 and it is judged whether the difference between the RSSI of the TCH and that of the U wave is at least equal to Th2 in S49. However, the present invention is not limited to this. For instance, it may be judged whether the RSSI of the assigned TCH is not more than Th1 in S48 and it may be judged whether the difference between the RSSI of the TCH and that of the U wave is not more than Th2 in S49.

(8) In FIG. 6, it is judged whether the RSSI of an assigned TCH is at least equal to Th3 in S67 and it is judged whether the difference between the RSSI of the TCH and that of the U wave is at least equal to Th4 in S68. However, the present invention is not limited to this. For instance, it may be judged whether the RSSI of the assigned TCH is not more than Th3 in S67 and it may be judged whether the difference between the RSSI of the TCH and that of the U wave is not more than Th4 in S68.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mobile station that selects one of a plurality of base stations according to electric field strengths of signals transmitted on control channels corresponding to the plurality of base stations, and establishes first a link and then a call connection with the selected base station on a traffic channel that is assigned via a control channel corresponding to the selected base station, the mobile station comprising:

a measuring means for measuring an electric field strength of a signal on the traffic channel when a link operation is performed to establish the link for the traffic channel; and a judging means for judging whether the link operation should be continued according to the measured electric field strength, wherein the measuring means measures the electric field strength by calculating an average of electric field strengths measured in a plurality of slots, and each of the electric field strengths comprises first and second signal levels, the first signal level being determined by a reception signal received from the selected base station, and the second signal level being a noise level and determined by no reception signal received from the selected base station.

2. The mobile station of claim 1, wherein when the measured electric field strength is not more than a predetermined value, the judging means judges that the link operation should be terminated.

3. The mobile station of claim 2 newly selects one of the plurality of base stations and requests the newly selected base station to assign a traffic channel if the judging means has judged that the link operation should be terminated.

4. The mobile station of claim 1,
wherein the measured electric field strength includes a signal level and a noise level, the signal level being a reception signal level when a signal is received from the selected base station on the traffic channel, and the noise level being a reception signal level when no signal is received from the selected base station on the traffic channel, and
the judging means judges that the link operation should be terminated if the signal level is not more than a first threshold value or a difference between the signal level and the noise level is not more than a second threshold value.

5. The mobile station of claim 4 newly selects one of the plurality of base stations and request the newly selected base station to assign a traffic channel if the judging means has judged that the link operation should be terminated.

6. A mobile station that selects one of a plurality of base stations according to electric field strengths of signals transmitted on control channels corresponding to the plurality of base stations, and establishes first a link and then a call connection with the selected base station on a traffic channel assigned by the selected base station,
the mobile station comprising:
a requesting means for issuing a traffic channel assignment request to the selected base station on a control channel corresponding to the selected base station;
a measuring means for measuring, after the traffic channel is assigned by the selected base station, an electric field strength of a link establishment signal transmitted from the selected base station on the traffic channel;
a judging means for judging whether the measured electric field strength of the link establishment signal is not more than a threshold value; and
a control means for terminating, if the judging means has judged that the measured electric field strength of the link establishment signal is not more than the threshold value, a link operation that establishes the link for the traffic channel and having the requesting means reissue the traffic channel assignment request on either the control channel corresponding to the selected base station or a control channel corresponding to a newly selected base station,
wherein the measuring means measures the electric field strength by calculating an average of electric field strengths measured in a plurality of slots, and each of the electric field strengths comprises first and second signal levels, the first signal level being determined by a reception signal received from the selected base station, and the second signal level being a noise level and determined by no reception signal received from the selected base station.

7. The mobile station of claim 6,
wherein the measuring means measures a noise level, which is a reception signal level when no signal is received from the selected base station on the traffic channel,
the judging means judges whether a difference between the measured electric field strength of the link establishment signal and the noise level is less than a second threshold value, and
the control means has the requesting means reissues the traffic channel assignment request if the difference is less than the second threshold value.

8. A base station that assigns a traffic channel to a mobile station and establishes first a link and then a call connection with the mobile station on the traffic channel, comprising:
a measuring means for measuring an electric field strength of a signal on the traffic channel when a link operation is performed to establish the link for the traffic channel; and
a judging means for judging whether the link operation should be continued according to the measured electric field strength,
wherein the measuring means measures the electric field strength by calculating an average of electric field strengths measured in a plurality of slots, and each of the electric field strengths comprises first and second signal levels, the first signal level being determined by a reception signal received from the selected base station, and the second signal level being a noise level and determined by no reception signal received from the selected base station.

9. The base station of claim 8,
wherein the measured electric field strength includes a signal level and a noise level, the signal level being a reception signal level when a signal is received from the mobile station on the traffic channel, and the noise level being a reception signal level when no signal is received from the mobile station on the traffic channel, and
the judging means judges that the link operation should be terminated if the signal level is not more than a first threshold value or a difference between the signal level and the noise level is not more than a second threshold value.

10. A base station that assigns a traffic channel to a mobile station in response to a traffic channel assignment request transmitted from the mobile station on a control channel, and establishes a link with the mobile station on the traffic channel,
the base station comprising:
a measuring means for measuring an electric field strength of a link establishment signal transmitted from the mobile station on the traffic channel;
a judging means for judging whether a link operation that establishes the link for the traffic channel should be continued according to the measured electric field strength of the link establishment signal; and
a control means for terminating the link operation if a judgement result of the judging means is negative,
wherein the measuring means measures the electric field strength by calculating an average of electric field strengths measured in a plurality of slots, and each of the electric field strengths comprises first and second signal levels, the first signal level being determined by a reception signal received from the selected base station, and the second signal level being a noise level and determined by no reception signal received from the selected base station.

11. The base station of claim 10,
wherein the measured electric field strength includes a signal level and a noise level, the signal level being a reception signal level when a signal is received from the mobile station on the traffic channel, and the noise level being a reception signal level when no signal is received from the mobile station on the traffic channel, and
the judging means judges that the link operation should be terminated if the signal level is not more than a first threshold value or a difference between the signal level and the noise level is not more than a second threshold value.

* * * * *